United States Patent [19]

Murayama et al.

[11] 4,424,880
[45] Jan. 10, 1984

[54] ACOUSTIC DEVICE FOR A HEAD PROTECTOR

[75] Inventors: Masato Murayama, Kawagoe; Mitsugi Akita, Tokyo, both of Japan

[73] Assignee: Honda Giken Kogyo Kabushiki Kaisha, Tokyo, Japan

[21] Appl. No.: 327,695

[22] Filed: Dec. 4, 1981

[30] Foreign Application Priority Data

Dec. 8, 1980 [JP] Japan .............................. 55-176593[U]
Dec. 8, 1980 [JP] Japan .............................. 55-176594[U]

[51] Int. Cl.³ ............................................. H04R 25/00
[52] U.S. Cl. ..................................... 181/129; 181/160; 179/156 R; 179/182 R; 2/422
[58] Field of Search ...................... 181/129, 136, 160; 179/107 R, 156 R, 156 A, 157, 182 R; 2/209, 422

[56] References Cited

U.S. PATENT DOCUMENTS 3,621,488 11/1971 Gales ............................... 181/129 X
4,110,583 8/1978 Lepper ........................ 179/182 R X Primary Examiner—Benjamin R. Fuller
Attorney, Agent, or Firm—Irving M. Weiner; Pamela S. Burt; John L. Shortley

[57] ABSTRACT

An acoustic device which includes a sound generating element for generating sounds, a case member having an inner chamber for containing the sound generating element therein, and a sound conducting member extending from the case member for conducting the sounds generated in the inner chamber. In order to removably attach the acoustic device to a helmet, the acoustic device is provided with a holding member for holding the case member on the helmet. The sound conducting member is formed to extend from the case member to a location substantially corresponding to an ear of a wearer of the helmet.

9 Claims, 4 Drawing Figures

ACOUSTIC DEVICE FOR A HEAD PROTECTOR

BACKGROUND OF THE INVENTION

1. Field of the Invention

This invention relates to an acoustic device for a head protector.

2. Description of Relevant Art

On many occasions such as when a person drives an open-top vehicle such as a motorcycle or the like, or when he engages in a work field such as in a machine shop or a chemical factory, or in a civil engineering or building work field, he is very often required to wear a head protector such as a helmet type head protector in the configuration of a head of a man, particularly of the type which is externally formed with a hard material. Further, such vehicle drivers, field workers, or the like, are also sometimes required to individually carry an acoustic device in order to positively establish audio communications with remote positions or receive audio instructions under noisy conditions.

Such communications or instructions often contain information having significant contents therein, and it is difficult to forecast under what circumstances such communications or instructions are provided. Nevertheless, when an acoustic device is held by hand such as by a rider of a motorcycle, a worker in a high place, and so on risks to human life frequently develop. In order to eliminate such risks, it has been proposed to wear a receiver or an earphone directly adjacent an ear. However, such proposed manner of wearing the receiver or earphone is likely to result in instability thereof, and besides, in some cases, such as where the head protector has a portion extending downwardly below the ear portion thereof such as in a helmet for a driver of a motorcycle, it is often difficult to wear the acoustic device adjacent an ear.

In order to solve such problems, a conventional head protector has sometimes been altered to incorporate an acoustic device in an ear portion of the head protector.

In such alteration, the body of the head protector must be worked for assembly of the acoustic device, and hence its production cost will necessarily increase. Besides, it is troublesome to assemble and disassemble the acoustic device to and from the head protector body, and the attempts to construct the acoustic device and the head protector to provide for easier assembly and disassembly would inevitably lead to further rise of the production cost. Because head protectors are often purchased in large quantities and are very often used in urban settings, it is desirable to make them simplified as possible with minimum cost.

The present invention effectively overcomes the foregoing problems involved in acoustic devices for head protectors.

SUMMARY OF THE INVENTION

It is an object of the present invention to provide an acoustic device for a head protector which can be manufactured at low production cost and with a simplified construction, whereby a head protector conventionally used for various general purposes can be utilized substantially as it is with substantially no alteration of the hard material portion of the head protector.

It is another object of the invention to provide an acoustic device for a head protector which can be easily mounted on and removed from a head protector.

It is a further object of the invention to provide an acoustic device for a head protector which does not substantially cause a user to feel uncomfortable when it is attached to a head protector.

The present invention provides an acoustic device for a head protector, comprising: a sound generating element for generating acoustic sound; a case member having an inner chamber for containing at least a part of said sound generating element therein; a sound conducting member extending from said case member for conducting the acoustic sounds generated in said inner chamber; and a holding member for holding said case member on said head protector; said sound conducting member being formed to extend from said case member held on said head protector to a location substantially corresponding to either one of the ears of the wearer of said head protector.

Preferred embodiments of the invention will be explained in the following description referring to the accompanying drawings. Other objects and features of the invention will become apparent therefrom.

DETAILED DESCRIPTION OF THE INVENTION

Throughout the following description of the preferred embodiments of the present invention, it will be understood that the acoustic device includes a small receiver serving as a sound generating element, and the head protector is of a helmet type which has protector portions for at least the sides of the head.

Figure 1:
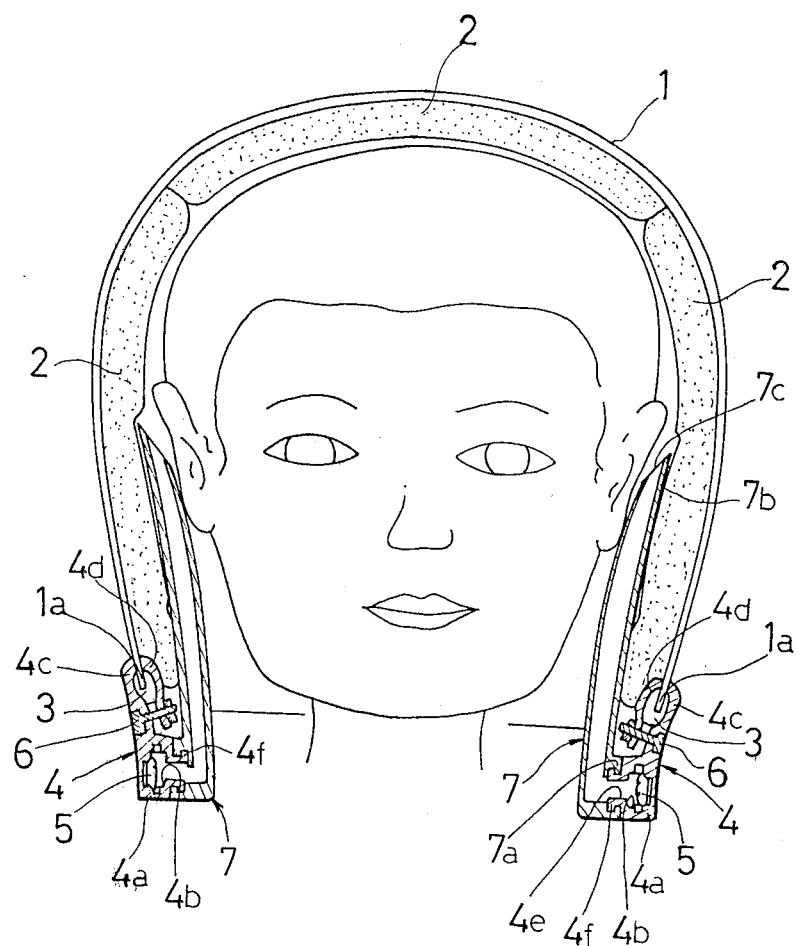
FIG. 1 is a vertical cross sectional view showing an acoustic device embodying the present invention in a position attached to a head protector.

Referring to FIG. 1, a helmet body 1 is made of a hard plastic material, and cushioning members 2 made of sponge material having a constant thickness are applied to an inner face of the helmet body 1. A liner 3 has a substantially elliptical cross section with a groove thereof fitted on a lower border 1a of the helmet body 1.

Receiver cases 4 are each attached to the liner 3 and are formed in a base portion 4a thereof with an inner chamber 4b for containing therein a conventional receiver 5. A clamping element or extension 4c is provided at the top end of the base portion 4a. Each receiver case 4 is applied and held to the lower border 1a of the helmet body 1 by tightening a bolt 6 to clamp the liner 3 between the clamping extension 4c and another clamping element 4d.

An opening 4e is formed in a side wall of the base portion 4a of the receiver case 4 and communicates with the inner chamber 4b. An engaging portion 4f having a flange is provided so as to extend outwardly from the opening 4e. A hollow sound conducting tube 7 has an engaging portion 7a thereof engaged with an engaging portion of the base portion 4a of the receiver case 4. The sound conducting tube 7 is made of a rubber or soft plastic material and is of a sufficient length with an upper end 7b thereof extended to a position corresponding to an ear of the wearer. The upper end 7b of the sound conducting tube 7 is cut obliquely inwardly such that an opening 7c formed at the oblique upper end 7b is opposed to the ear of the wearer.

The above-described construction in accordance with the invention will provide various advantages. Firstly, a helmet which is conventionally used for general purposes can be utilized as it is without modifying same. Secondly, provision of the sound conducting tube 7 permits sounds to be positively transmitted from within the inner chamber 4b to the ear of the helmet wearer and also permits the receiver 5 to be designed with a reduced capacity. Thirdly, the volume of sound leakage to the outside can also be reduced so that a third party may not be annoyed by such emitted sounds. In addition, the presence of the sound conducting tubes 7 permits the helmet to be designed such that the receiver case 4 can be held at a position spaced from the ear of the wearer a distance corresponding to the length of the tube, that is, at the lower border 1a of the helmet body 1.

Figure 2:
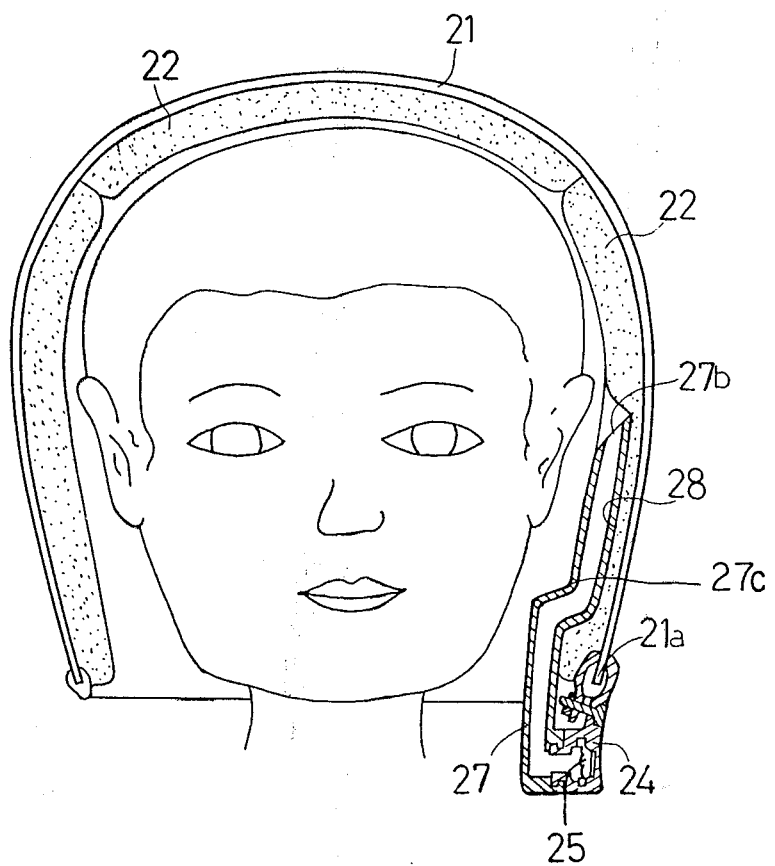
FIG. 2 is a similar vertical cross sectional view showing a modified form of a sound conducting tube of the acoustic device of FIG. 1.

Referring to FIG. 2, there is shown a modified form of a sound conducting tube whereas in the embodiment of FIG. 1 the sound conducting tube 7 extends upwardly from the opening portion 4e of the receiver case 4 substantially linearly along the surface of the cushioning member 2 inside the helmet body 1, in the embodiment of FIG. 2 the sound conducting tube 27 has an outwardly bent portion 27c substantially in the middle along the length thereof. In an assembled or attached position of the sound conducting tube 27 to a helmet body 21, a portion of the sound conducting tube 27 between the bent portion 27c and an upper end 27b is accommodated in a recessed groove 28 formed in cushioning members 22 which are applied to the inner surface of the helmet body 21, and thus the tube 27 extends adjacent and along the side wall of the helmet body 21. With such arrangement, the area of a portion of the sound conducting tube 27 which contacts the face of a helmet wearer can be reduced, and any fear that the sound conducting tube will be compressed between the helmet and the face of the helmet wearer is thus reduced.

It is to be noted that it is selective as to whether the helmet has a pair of receivers provided on opposite left and right sides thereof or has a single receiver on one side thereof. Moreover, the manner in which a receiver case is attached to the lower border of the helmet is not limited to the arrangements of the disclosed embodiments, and, for example, a clip or a face fastener may be employed for removably attaching the receiver case, or adhesives may be used for securely attaching the same.

Figure 3:
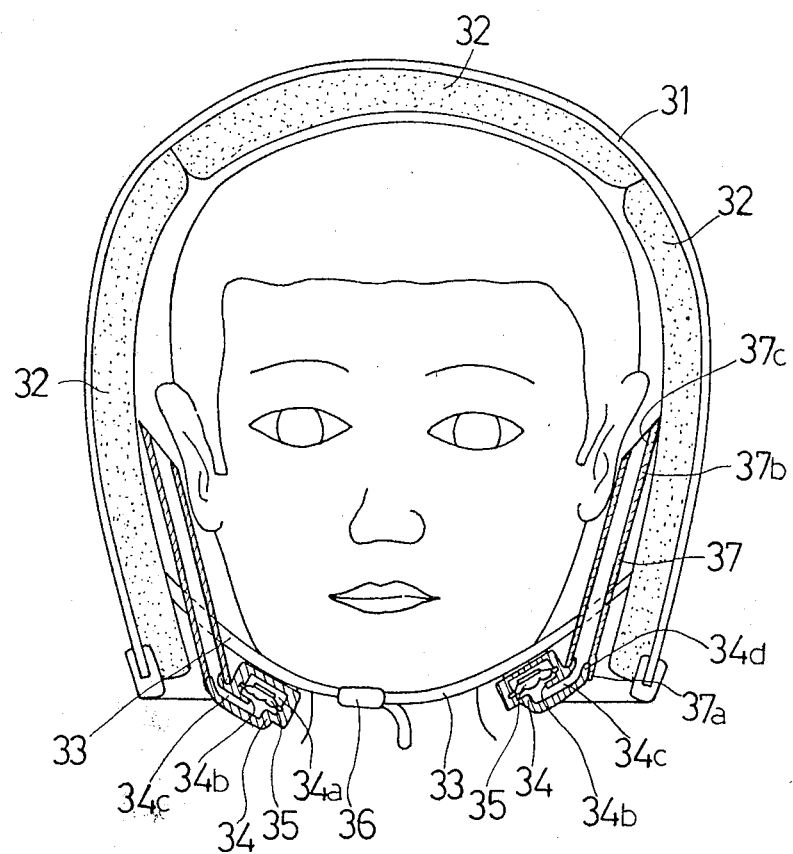
FIG. 3 is a similar vertical cross sectional view showing a second embodiment of the acoustic device of the invention in a position attached to a head protector.

Another embodiment of the invention is shown in FIG. 3. A helmet body 31 is made of a hard plastic material and has applied to the inner peripheral wall thereof cushioning members 32 made of a sponge material and having a constant thickness. A pair of chin straps 33 have respective one ends thereof fastened to opposite lower inside surface portions of the body 31, and buckle element 36 is provided for selectively binding both straps 33 together.

A receiver case 34 is removably attached to each of the chin straps 33 by a well known easily disengageable means such as a fastening hook. The receiver case 34 has formed therein an inner chamber 34a for containing a receiver 35 therein, and a passage 34c communicating with the inner chamber 34a through an opening 34b. An engaging portion 34d is provided to extend laterally from a bottom portion of the receiver case 34 which defines the passage 34c. The engaging portion 34d of the receiver case 34 engages with a base end 37a of a hollow sound conducting tube 37 fitted thereon. The sound conducting tube 37 is made of a rubber or soft plastic material and has a sufficient length with an upper end 37b thereof positioned adjacent the ear of the helmet wearer when the helmet is worn. The upper end 37b of the sound conducting tube 37 is cut obliquely inwardly such that an opening 37 formed thereby is opposed to the ear of the helmet wearer.

In addition to the advantages obtained by the first embodiment, this embodiment is further advantageous in that a receiver is more easily removed than in the first embodiment.

Figure 4:
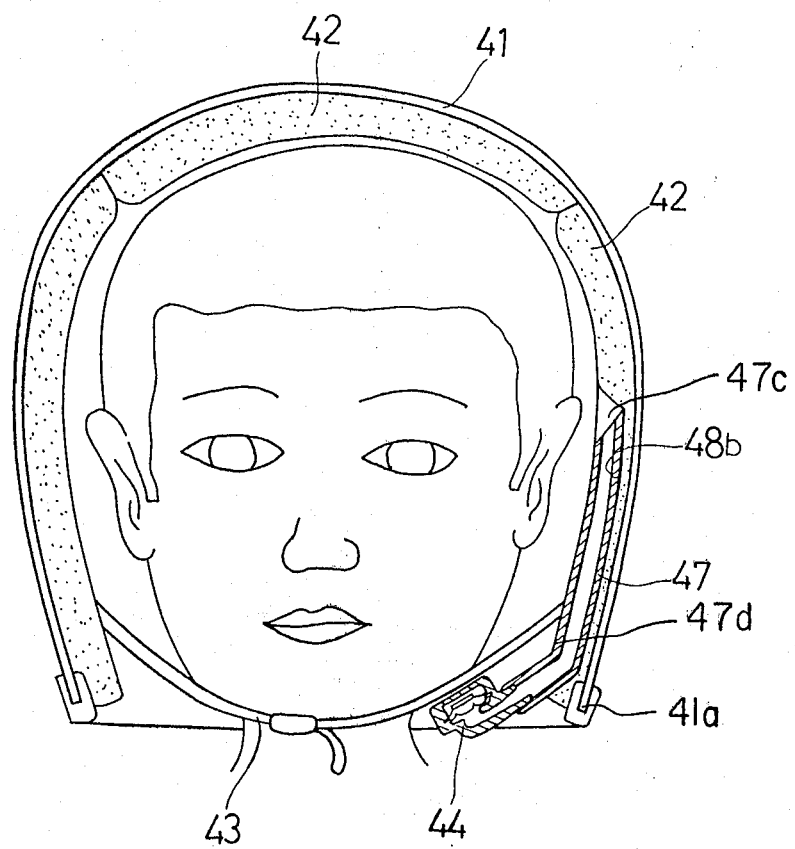
FIG. 4 is a similar vertical cross sectional view showing a modified form of a sound conducting tube of the acoustic device of FIG. 3.

FIG. 4 shows a modified form of the sound conducting tube of the embodiment of FIG. 3.

A sound conducting tube 47 has a bent portion 47d at substantially a mid point along the length thereof. In a position of the sound conducting tube 47 assembled or attached to a helmet body 41, a portion of the sound conducting tube 47 between the bent portion 47d and an upper end 47c thereof is accommodated in a recessed groove 48b formed in cushioning members 42 on the inside surface of the helmet body 41 and thus extends along the inside of a side wall of the helmet body 41 from the lower border 41a of the helmet body side wall to a location substantially corresponding to an ear of the wearer of the helmet. With such arrangement, even when the receiver case is attached to a chin strap of the helmet, the sound conducting tube will not possibly contact the face of the helmet wearer, as in the case of the embodiment shown in FIG. 2.

Again, the receiver case may be attached to a chin strap in either manner, i.e., removably with a band, a face fastener, and so on, or securely with adhesives and so on. Or better, the receiver case may have slits formed therein through which a chin strap can be threaded so that the attaching position of the receiver case may be adjustably moved along the length of and relative to the chin strap.

What is claimed is:

1. An acoustic device for a head protector, comprising:
 a sound generating element for generating acoustic sounds;
 a case member having an inner chamber for containing at least a part of said sound generating element therein;
 a sound conducting member extending from said case member so as to conduct the acoustic sounds generated in said inner chamber;
 a holding member for holding said case member on said head protector;
 said sound conducting member being formed to extend from said case member held on said head protector to a location substantially corresponding to an ear of a wearer of said head protector; and
 said acoustic device being detachably mounted to said head protector.

2. An acoustic device for a head protector, according to claim 1, wherein said holding member comprises a clamp structure.

3. An acoustic device for a head protector according to claim 2, wherein said clamp structure is formed integrally with said case member.

4. An acoustic device for a head protector according to claim 1 or 2, wherein said holding member comprises a chin strap provided on said head protector.

5. An acoustic device for a head protector according to claim 4, wherein said case member is fixed relative to said chin strap.

6. An acoustic device for a head protector according to claim 4, wherein said case member is slidable relative to said chin strap.

7. An acoustic device for a head protector according to claim 1, wherein said sound conducting member is accommodated in a recessed groove formed in a cushioning element applied to the inner surface of said head protector.

8. An acoustic device for a head protector according to claim 1, wherein:
said holding member is detachably connected to said head protector adjacent a lower border portion of said head protector.

9. An acoustic device for a head protector according to claim 8, wherein:
said sound conducting member comprises a sound conducting tube having a lower end thereof connected to said case member; and
said tube has an upper end thereof disposed in a position substantially corresponding to an ear of said wearer of said head protector, said upper end being provided with an opening for transmitting sound to the ear of said wearer.

* * * * *